United States Patent
Iijima et al.

(10) Patent No.: US 6,317,977 B1
(45) Date of Patent: Nov. 20, 2001

(54) MANUFACTURING METHOD FOR FLUID PASSAGE FORMING MEMBER MADE OF SYNTHETIC RESIN

(75) Inventors: Katsumi Iijima; Yutaka Yoshida; Koji Wada, all of Ibaraki (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/426,903

(22) Filed: Oct. 26, 1999

(30) Foreign Application Priority Data

Oct. 26, 1998 (JP) .................................................. 10-304001

(51) Int. Cl.[7] .......................... B23B 31/12; B23B 31/20; B23P 17/00
(52) U.S. Cl. ................................. 29/890.124; 29/890.12; 156/84; 156/85; 156/257; 156/292; 156/308.2; 156/309.06; 137/884
(58) Field of Search ........................ 29/890.12, 890.124, 29/890.126, 890.127; 156/84, 85, 257, 256, 292, 308.2, 309.6; 137/884

(56) References Cited

U.S. PATENT DOCUMENTS

| | | | |
|---|---|---|---|
| 2,963,394 | * 12/1960 | Wilkinson . | |
| 3,495,604 | * 2/1970 | Trask, III . | |
| 3,668,756 | 6/1972 | Wieme | ................................. 29/157 |
| 3,712,320 | * 1/1973 | Jansen . | |
| 4,355,076 | 10/1982 | Gash | .................................... 428/411 |
| 4,384,016 | 5/1983 | Ide et al. | .................................... 428/1 |
| 4,390,384 | 6/1983 | Turner | ................................. 156/221 |
| 4,449,426 | * 5/1984 | Younger | ................................. 137/884 |
| 4,875,956 | 10/1989 | Brackett | ................................. 156/84 |
| 4,999,069 | 3/1991 | Brackett et al. | ........................ 156/84 |
| 5,041,181 | 8/1991 | Brackett et al. | ........................ 156/84 |
| 5,932,799 | * 8/1999 | Moles . | |
| 6,234,191 | * 5/2001 | Clarke | ................................. 137/884 |

* cited by examiner

Primary Examiner—S. Thomas Hughes
Assistant Examiner—Eric Compton
(74) Attorney, Agent, or Firm—Paul A. Guss

(57) ABSTRACT

In manufacture of a fluid passage forming member by heating and joining passage members formed of a thermoplastic synthetic resin, there is provided a method for forming the external configurations of the fluid passages and the fluid passage forming members to virtually predetermined configurations despite the heating.

In this method, to join passage members 1a through 1c made of a thermoplastic synthetic resin, fluid passages formed by apertures 3 or grooves 4 in junction surfaces 2 between the passage members are formed by allowing expected shrinkage of the passages beforehand so that they are formed to have predetermined design sections by the shrinkage when heating and joining the passage members. The passage members are closely fitted in a forming mold 10, sealed in a state wherein the jointing surfaces to be joined with each other are pressed into contact, and heated and softened to join them. Deformation of the passage members in a direction orthogonal to the junction surfaces is restrained by the sealed forming mold, and a flow component of a material produced due to expansion of the passage members caused by heating of the passage members and contact pressing of the junction surfaces is absorbed mainly by shrinkage of the fluid passages.

13 Claims, 3 Drawing Sheets

MANUFACTURING METHOD FOR FLUID PASSAGE FORMING MEMBER MADE OF SYNTHETIC RESIN

FIELD OF THE INVENTION

The present invention relates to a method for manufacturing a fluid passage forming member by joining at least two passage members made of a thermoplastic synthetic resin such as a methacrylic resin.

DESCRIPTION OF THE RELATED ART

In a member for forming a fluid passage such as a manifold in which a plurality of solenoid valves for controlling supply and exhaust of compressed air are arranged and installed, a fluid passage forming member therefor is composed using a methacrylic resin or other light-transmitting synthetic resin in order to easily form a complicated passage or to make a fluid flowing through a passage formed therein visible. This is already known by, for example, the specification of U.S. Pat. No. 4,875,956, the specification of U.S. Pat. No. 4,999,069, or the specification of U.S. Pat. No. 5,041,181, etc. This type of fluid passage forming members is formed by joining at least two passage members having a plurality of junction surfaces that are joined to each other to form complicated fluid passages, and fluid passages formed by apertures or grooves in communication with each other between a pair of passage members are provided in junction surfaces of the foregoing passage members.

Such a fluid passage forming member is lighter than a solenoid valve manifold that has conventionally been used and exhibits stability against chemicals or the like, thus making it suitable for a passage of fluids related to medical treatment, chemicals, etc. However, if those fluids are to be passed through the fluid passage forming members, then the junction surfaces of the foregoing passage members that are joined with each other cannot be connected with an adhesive agent that includes an organic solvent when manufacturing the fluid passage forming members. This is because there is apprehension that an organic solvent may solve out into a fluid passing through the passage. For this reason, it is appropriate to form passage members by a thermoplastic synthetic resin that is stable against chemicals, and to heat and soften junction surfaces of the passage members so as to join the passage members at the junction surfaces by melting.

However, when heating and joining a pair of passage members formed of a thermoplastic synthetic resin, it is necessary to form fluid passages in advance by forming apertures or grooves, which communicate with each other, in the junction surfaces of the passage members and to heat and soften the passage members before pressing the junction surfaces into contact. At this time, the fluid passages formed beforehand shrink due to expansion of the synthetic resin constituting the passage members, or the fluid passages deform due to an external force applied to join the passage members formed of the softened synthetic resin. Hence, there are cases wherein the fluid passages cannot be formed in accordance with a design thereof, or the external configurations of the fluid passage forming members are deformed during the heating and joining process.

Thus, measures are required to prevent the shrinkage or deformation of fluid passages when heating and joining passage members. Furthermore, it is also necessary to rework the external configurations of the fluid passage forming members that have been made by joining the passage members for the purpose of installing or fixing solenoid valves to the mounting surfaces of the fluid passage forming members, connecting a fluid pipes thereto, etc.

SUMMARY OF THE INVENTION

The present invention has been made with a view toward solving the problem described above with a simple means, and it is basically an object thereof to provide a method that makes it possible to easily set a fluid passage to values close to design values, form an external configuration of a fluid passage forming member to a virtually predetermined configuration, and require easy machining if rework is necessary in manufacture of a fluid passage forming member formed of a thermoplastic synthetic resin.

Another object of the present invention is to provide a manufacturing method for a fluid passage forming member that permits heating at a relatively low temperature when joining passage members composed of a thermoplastic synthetic resin so as to minimize deformation during a joining process.

To these ends, according to the present invention, there is provided a method for manufacturing a fluid passage forming member by joining at least two passage members that are formed of a thermoplastic synthetic resin and have junction surfaces to be joined with each other. This method includes the steps of: forming fluid passages composed of apertures or grooves that are in communication with each other between a pair of passage members in the junction surfaces between the passage members, allowing for a shrinkage of the passages in advance so that the fluid passages having predetermined design sections may be formed by shrinkage of the fluid passages during a heating and joining process of the pair of passage members; and closely fitting the passage members in a forming mold with the passage members joined with each other at junction surfaces, sealing the mold while pressing the junction surfaces to be joined into contact, and heating and softening them to join them by melting at the junction surfaces thereby effecting connection at the junction surfaces of the passage members; wherein, in joining the passage members, deformation of the passage members in a direction orthogonal to the junction surfaces is restrained by an internal surface of the sealed forming mold, and a flow component of a material produced due to expansion of the passage members caused by heating of the passage members and contact pressing of the junction surfaces is moved along a surface parallel to the junction surfaces thereby to absorb it mainly by shrinkage of the fluid passages.

In the manufacturing method for the fluid passage forming members made of a synthetic resin, the close fitting of the passage members into the forming mold is effectively accomplished by pressing mold pieces into contact with the passage members in the forming mold at least in a direction in which the passage members joined with each other at the junction surfaces are deposited or in a direction parallel to the junction surfaces thereby to fix them. In this case, the contact pressing force between the junction surfaces of the passage members at the time of sealing the forming mold can be set by a tightening torque of a bolt for fixing an upper mold piece of the forming mold.

When forming the passage members by using a methacrylic resin, setting a heating temperature for joining the passage members at 110 to 130° C. is effective for preventing shrinkage or deformation of the fluid passages. Using a cast material as the methacrylic resin for forming the passage members is advantageous in that the directivity of shrinkage will be reduced.

Furthermore, in the manufacturing method for fluid passage forming members, use of a light transmitting thermoplastic synthetic resin for forming the passage members enables a liquid passing in the passages to be visible.

According to the manufacturing method for a fluid passage forming member made of a synthetic resin, apertures or grooves communicating with each other between a pair of passage members are formed with an allowance for an expected shrinkage which has been experimentally or empirically obtained in advance so that fluid passages having predetermined design sections may be formed by shrinkage of the fluid passages that takes place during a heating and joining process. Hence, even if the fluid passages deform because of expansion of a synthetic resin that occurs while heating and joining the passage members, or an external force applied to a softened synthetic resin for joining, or due to other reasons, the fluid passages can be set to values close to design values. When the fluid passages deform, since the fluid passages formed by the apertures or grooves are in communication with outside through gaps between mold pieces in a forming mold, there should be no case wherein air is sealed in the fluid passages, preventing the fluid passages from deforming.

Moreover, joining the passage members at the junction surfaces is effected by closely fitting the passage members into the forming mold in a state wherein the passage members are joined with each other at the junction surfaces and mold pieces are pressed into contact with the passage members in the forming mold at least in one direction out of a direction in which the passage members are deposited and a direction parallel to the junction surfaces thereby to fix them. Rather than always applying a virtually constant contact pressing force between the junction surfaces of the passage members by a spring or the like at the time of sealing the forming mold, the contact pressing force is set by a tightening torque of a bolt or the like for fixing an upper mold piece of the forming mold. When the contact pressing force is cancelled by softening of the synthetic resin constituting the passage members, no contact pressing force larger than that will be applied. As a result, the passage members that have been heated and softened in the sealed forming mold by the contact pressing force do not unnecessarily cause the apertures or grooves in the junction surfaces to deform; hence, the external configurations thereof conform to an internal configuration of the forming mold and can be formed to virtually predetermined configurations by the forming mold. Thus, even if rework is to be added to the external configurations or the like, only simple machining will be required.

DESCRIPTION OF THE PREFERRED EMBODIMENTS

Figure 1:
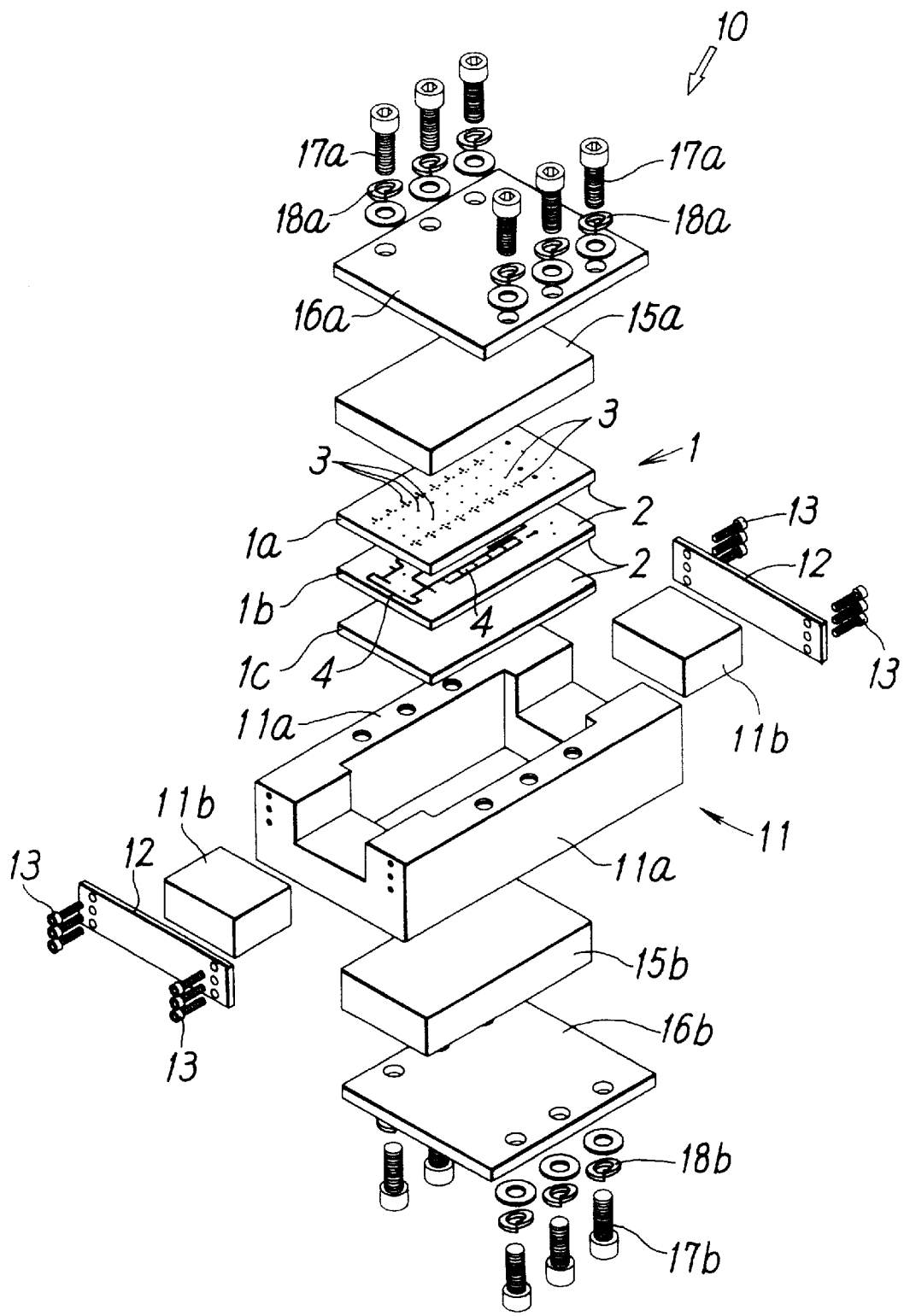
FIG. 1 is a perspective view for explaining an embodiment of a manufacturing method for a fluid passage forming member made of a synthetic resin in accordance with the present invention.
Figure 2:
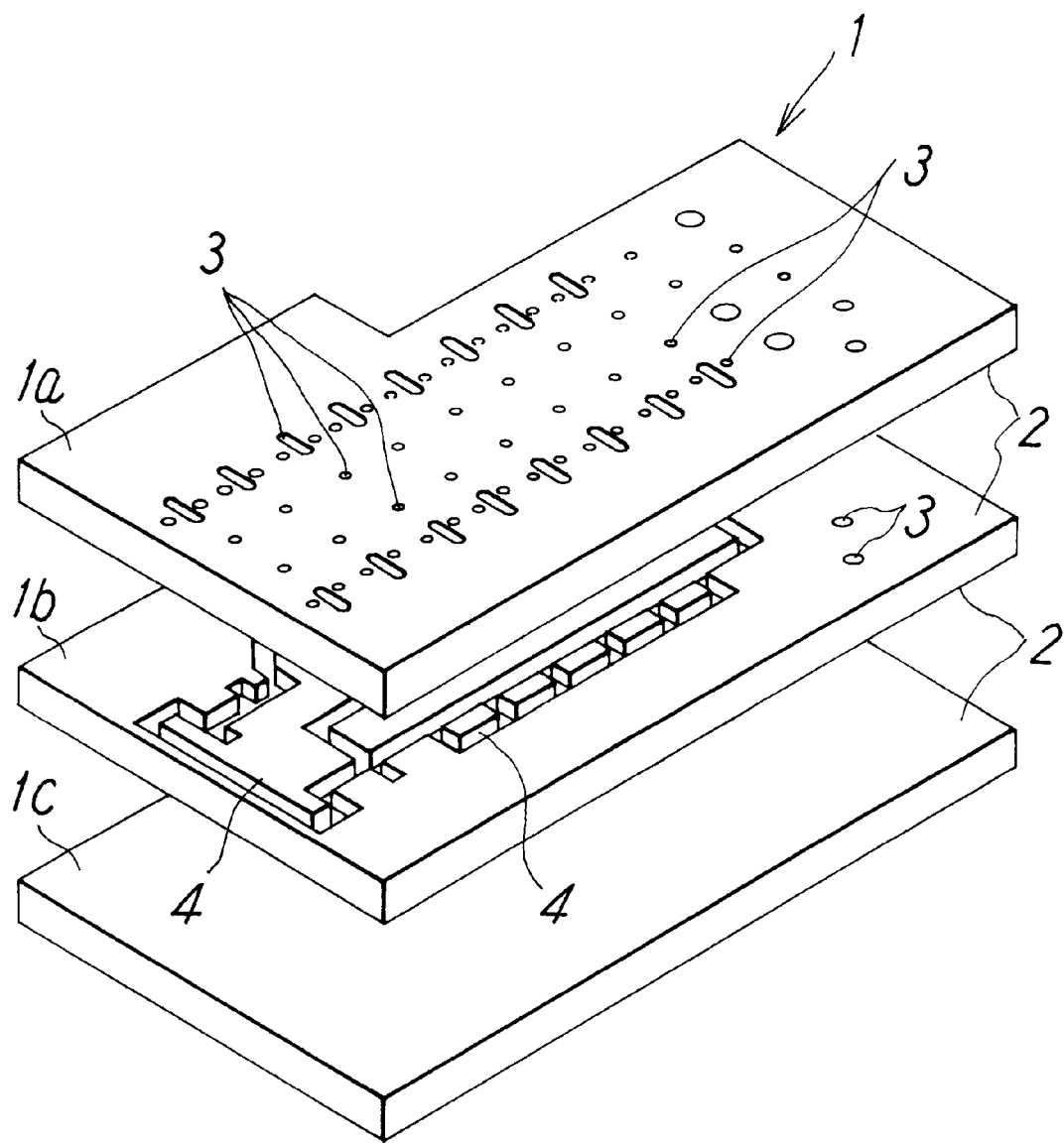
FIG. 2 is an enlarged perspective view of a passage member used for manufacturing the fluid passage forming member in the present invention.

A fluid passage forming member 1 manufactured using the method in accordance with the present invention is generally formed by a light-transmitting thermoplastic synthetic resin that is transparent or semitransparent such as, for example, methacrylic resin, polyvinyl chloride resin, or a polycarbonate resin. FIG. 1 and FIG. 2 show a case wherein three plate-shaped passage members 1a through 1c that have junction surfaces 2 to be joined with each other are joined. When a methacrylic resin is used for the fluid passage forming member 1, it is more advantageous to use a cast material featuring less orientation of molecular chains than to use an extruded material because there will be less directivity of shrinkage. The light transmitting property of the synthetic resin materials is not a must although it is advantageous in that a fluid passing therein can be visually observed or checked.

To manufacture the fluid passage forming member 1, first, in order to secure dimensional stability of a material constituting the passage members 1a through 1c, the material is preshrunk by heating. When the passage members 1a through 1c are made of a methacrylic resin constituent, for example, the heating temperature for the preshrinking is set to approximately 140° C. This temperature is maintained over an appropriate period of time required for the preshrinkage according to the thickness of the constituent. The heating temperature does not have to be 140° C.; it may be set at an arbitrary temperature that allows preshrinkage to be efficiently effected. After heating the passage members 1a through 1c for preshrinking them, they are slowly cooled over a sufficient period of time, e.g. for five to eight hours.

Subsequently, the junction surfaces 2 of the passage members 1a through 1c undergo machining performed using a drill, an end mill, a reamer, etc. thereby to form apertures 3 or grooves 4 in communication with each other between the junction surfaces of a pair of passage members, thus forming fluid passages required at the time of joining the passage members. In addition, the external configurations of the passage members are shaped to predetermined configurations.

As illustrated in FIG. 1 and FIG. 2, numerous apertures 3 forming passages for supply, output, and discharge of numerous solenoid valves are opened in one passage member 1a on which the solenoid valves are rested in actual use, and the passage member 1b to be joined thereto is also provided with the apertures 3 to be in communication with the foregoing apertures or grooves 4 to be in communication with the plural apertures 3. These grooves 4 are placed in communication with a required liquid supply source to supply the same liquid to the numerous apertures 3 provided in the passage member 1a or to simultaneously supply the liquid coming out of the numerous apertures 3 to the same delivering section. All of the apertures 3 and the grooves 4 are opened to the outer surfaces of the passage members 1a through 1c, so that no passage space in the joined passage members 1a through 1c will be sealed. The passage member 1c shown in the drawing is not provided with any apertures or grooves; however, it may be provided with apertures or grooves also as necessary.

Importantly, when the plural passage members 1a through 1c are placed in a forming mold and heated for joining them as it will be discussed hereinafter, the machined fluid passages shrink due to the heating or pressing into contact among the passage members while heating and joining them, and the foregoing apertures 3 and grooves 4 are formed to have sectional areas with an allowance for a shrinkage of the fluid passages beforehand so as to form the fluid passages with predetermined design sections by the shrinkage. The shrinkage can be easily known empirically or experimentally when the design of the passage members 1a through 1c is completed.

The surfaces of the machined passage members 1a through 1c are cleaned in advance prior to the heating and joining process. To effect the cleaning, for example, ultrasonic waves may be applied in a cleaning solution with a surfactant or pure water, or finish cleaning with an ethyl alcohol solution or the like may be carried out after the ultrasonic cleaning.

To join the junction surfaces 2 of the passage members 1a through 1c, the passage members are closely fitted in a forming mold (jig) 10 in a state wherein they are joined with each other at their junction surfaces, the mold is sealed in a state wherein the junction surfaces that are joined with each other are pressed into contact, and the passage members are heated to be softened thereby to join them at their junction surfaces by melting. The forming mold 10 is equipped with a mold main body 11 having a pair of opposing side walls 11a to enable the deposited passage members 1a through 1c to be fitted as closely as possible between the paired side walls 11a in the mold main body 11. Furthermore, mold pieces 11b are provided in such a manner that it is orthogonal to the paired side walls 11a of the mold main body 11 and in parallel to the junction surfaces 2 of the passage members. Hence, the passage members 1a through 1c can be closely fitted in the forming mold 10 also between the mold pieces 11b by securing a fixing plate 12 by a bolt 13 in a state wherein the mold pieces 11b are pressed into contact with the passage members 1a through 1c in the forming mold 10. The mold main body 11 may be provided with side walls made integral with the mold main body 11 also on the sides on which the mold pieces 11b are provided and which are orthogonal to the side walls 11a. Thus, the mold main body 11 has two pairs of side walls to make it possible to closely fit all peripheries of the passage members 1a through 1c that are deposited in the mold main body.

The passage members 1a through 1c in the forming mold 10 are shrunk in the direction, in which they are deposited, by fixing them in a state wherein upper and lower mold pieces 15a and 15b, especially the upper mold piece 15a, are pressed into contact with the passage members in the forming mold. More specifically, the contact pressing force among the junction surfaces 2 of the passage members 1a through 1c when the forming mold is sealed is applied by securing a fixing plate 16a, which is abutted against the outer side of the upper mold piece 15a in the forming mold 10, to the mold main body 11 by bolts 17a via spring washers 18a. To be further specific, the contact pressing force among the junction surfaces is set by a tightening torque used for fixing the upper mold piece 15a by the bolts 17a, and applied via the spring washers 18a. Setting the tightening torque of the bolts 17a to a constant value provides a virtually constant contact pressing force that is applied to the fixing plate 16a and the mold piece 15a via the spring washers 18a.

In this case, the contact pressing force applied to the junction surfaces 2 when sealing the forming mold is not always a virtually constant contact pressing force that is applied to the junction surfaces by a spring or the like irrespectively of the deformation of the passage members 1a through 1c. The contact pressing force is applied in a state wherein the upper mold piece 15a is pressed into contact with the passage members 1a through 1c in the forming mold to fix them, and at this time, the contact pressing force is set by the tightening torque of the bolts 17a used to fix the upper mold piece 15a. When the contact pressing force is cancelled by the softening of the synthetic resin constituting the passage members 1a through 1c, no more contact pressing force is applied by the mold piece 15a to the internal passage members 1a through 1c, although the fixing plate 16a is pressed in contact with the mold main body 11 by the urging force of the spring washers 18a.

The lower mold piece 15b can be attached to the mold main body 11 beforehand by securing a fixing plate 16b to the mold main body 11 by bolts 17b via spring washers 18b.

Thus, the junction surfaces 2 of the passage members 1a through 1c that have been softened by being heated in the forming mold 10 sealed by the contact pressing force are firmly pressed into contact, in an early stage of softening, by the contact pressing force and closely joined to an extent that the junction surfaces can be no longer visually observed, that is, the synthetic resin constituents composing the passage members to be joined are completely integrated materialwise. At this time, the apertures 3 and the grooves 4 inevitably develop some deformation (mainly shrinkage of sections) because of the pressure applied by the mold piece 15a due to the synthetic resin of the passage members that has expanded and softened. As mentioned above, however, the desired fluid passage forming members can be obtained by forming the apertures 3 and the grooves 4 with sectional areas that allow for the expected shrinkage so that the fluid passages of the predetermined design sections can be formed by the shrinkage.

Regarding the deformation of the fluid passages, the fluid passages formed in terms of the apertures 3 or the grooves 4 are in communication with outside through gaps between the mold main body and the mold pieces in the forming mold 10; hence, there will be no danger of air being sealed in the fluid passages to interfere with the deformation of the fluid passages.

The shrinkage of the apertures 3 or the grooves 4 does not necessarily depend on the characteristics such as an expansion coefficient of the synthetic resin itself; it varies depending on the contact pressing force applied to the passage members 1a through 1c, or the sizes of the gaps or the like between the forming mold 10 and the passage members 1a through 1c that are closely fitted therein. If there are numerous adjoining apertures 3 or grooves 4, the shrinkage of the apertures 3 or the grooves 4 will naturally be uneven; therefore, it is necessary to experimentally or empirically obtain the shrinkage of the apertures 3 or the grooves 4.

Furthermore, regarding the fluid passage forming members constituted by the passage members 1a through 1c, when joining the passage members 1a through 1c, the deformation of the passage members in the direction orthogonal to the junction surfaces 2 is restrained by the inner surface of the sealed forming mold 10. As the passage members 1a through 1c expand from heating and as the junction surfaces are pressed into contact, the synthetic resin constituent flows along the surface parallel to the junction surfaces; however, the flow component is absorbed primarily by the shrinkage of the fluid passages and by being charged into minute spaces between the passage members and the inner surface of the forming mold, so that the external configurations of the fluid passage forming members conform to the inner configuration of the forming mold 10, thus being formed into virtually predetermined configurations by the forming mold 10. Therefore, even if rework is required to be added to the configurations or the like after molding, only simple machining will be necessary.

If the pressing force applied to the passage members 1a through 1c from the mold piece 15a drops due to the joining and the pressing force is virtually no longer applied, then the apertures 3 or the grooves 4 in the passage members will not be deformed.

Generally, a suitable heating temperature for joining the passage members 1a through 1c lies at a point where the synthetic resin stays in the softened state required for the joining, the point being somewhere between the glass transition point and the softening point. When forming the passage members 1a through 1c by using a methacrylic resin, it is usually preferable to set the heating temperature at 110 to 130° C. to prevent shrinkage or deformation of the fluid passages; more preferably, the heating temperature is set at around 120° C. (about 115 to about 125° C.). Even when the passage members are formed of other synthetic resin material, it is desirable to set the heating temperature at a minimum temperature required for softening the synthetic resin to effect the joining in order to permit deformation to be stabilized. The time for maintaining the passage members in the forming mold at the joining temperature typically ranges from two to eight hours although it varies depending on the thickness of the passage members, the temperature to be maintained, etc.

Furthermore, in order to remove internal stress caused by heat during the joining process, it is desirable to subject the fluid passage forming members that have been taken out of the forming mold 10 to annealing at about 80° C. for about eight hours.

Figure 3:
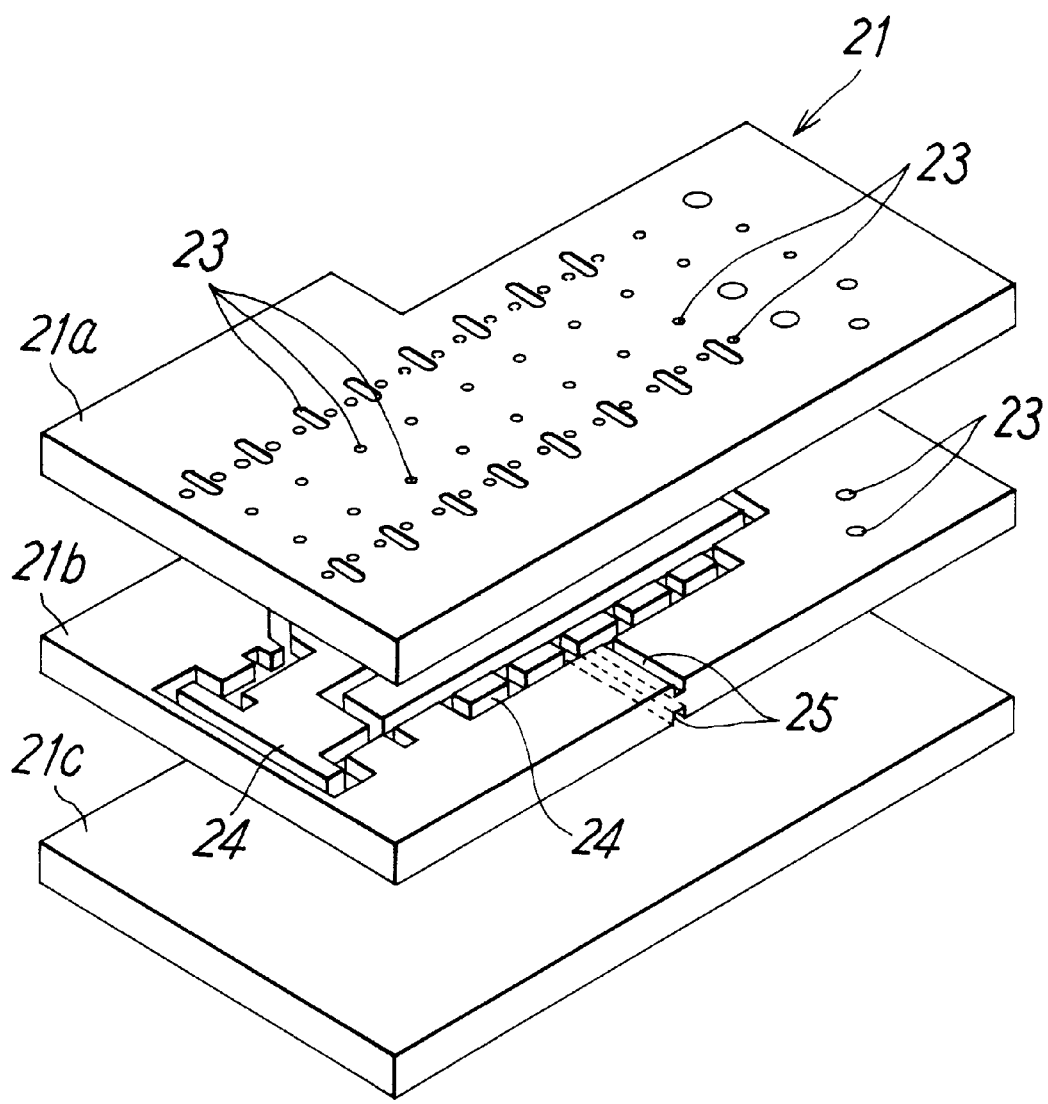
FIG. 3 is an enlarged perspective view showing another structural example of the passage member.

As set forth above, the fluid passages deform when the passage members 1a through 1c are heated to soften them in the sealed forming mold 10. At this time, spaces formed in the apertures 3 or the grooves 4 are opened in the forming mold 10, and the interior of the forming mold 10 is in communication with outside through the gaps or the like between the mold main body 11 and the mold pieces 11b, 15a, and 15b; hence, there will be no danger of air being sealed in the fluid passages, preventing the deformation of the fluid passages. However, in the passage members 1a through 1c, there are cases wherein the apertures 3 or the grooves 4 opened in the forming mold 10 come in close contact with the inner surface of the forming mold and are consequently closed. In such a case, as illustrated in FIG. 3, any one of passage members 21a through 21c having apertures 23 or grooves 24 as in the case shown in FIG. 2 may be provided with a single or plural auxiliary passages 25 for opening the apertures 23 or the grooves 24 to the interior of the forming mold. These passages 25 will be sealed by an appropriate means after molding the fluid passage forming member 21.

The passage members joined as described above cannot avoid incurring some deformation as a whole, requiring mechanical secondary machining such as milling the configurations to predetermined dimensions, or finish machining, machining connecting ports for connecting pipe joints to the fluid passages, and tapping for installation. Thereafter, final cleaning is carried out to complete manufacture.

What is claimed is:

1. A manufacturing method for manufacturing a fluid passage forming member (1, 21) made of a synthetic resin by joining at least two passage members (1a through 1c, 21a through 21c) that are formed of a thermoplastic synthetic resin and have junction surfaces (2, 2) to be joined with each other, said method comprising the steps of:
    forming fluid passages composed of apertures (3, 23) or grooves (4, 24) in communication with each other between a pair of passage members in the junction surfaces (2, 2) between said passage members, allowing for shrinkage of the passages in advance so that fluid passages having predetermined design sections may be formed by shrinkage of said fluid passages during a heating and joining process of the pair of passage members; and
    closely fitting said passage members in a forming mold (10) with the passage members joined with each other at junction surfaces, sealing the mold while pressing the junction surfaces to be joined to each other into contact, and heating and softening them to join them by melting at said junction surfaces thereby effecting connection at the junction surfaces of said passage members,
    wherein, in joining said passage members, deformation of the passage members in a direction orthogonal to said junction surfaces is restrained by an inner surface of the sealed forming mold, and said apertures (3, 23) or grooves (4, 24) are maintained in communication with the outside of a forming mold so that a flow component of a material produced due to expansion of the passage members caused by heating of the passage members and contact pressing of said junction surfaces is moved along a surface parallel to the junction surfaces thereby to absorb it mainly by shrinkage of said fluid passages.

2. A manufacturing method for a fluid passage forming member made of a synthetic resin according to claim 1, wherein the thermoplastic synthetic resin constituting the passage members is provided with a light transmitting property.

3. A manufacturing method for a fluid passage forming member made of a synthetic resin according to claim 1, wherein close fitting of the passage members into the forming mold is effected by pressing a mold piece (11b, 15a) into contact with the passage members in the forming mold at least in one direction among a plurality of directions including a direction in which the passage members joined with each other at the junction surfaces are deposited and a direction parallel to said junction surfaces thereby to fix them.

4. A manufacturing method for a fluid passage forming member made of a synthetic resin according to claim 1, wherein a contact pressing force between the junction surfaces of the passage members at the time of sealing the forming mold is set by a tightening torque of a bolt for fixing an upper mold piece of the forming mold.

5. A manufacturing method for a fluid passage forming member made of a synthetic resin according to claim 1, wherein the passage members are formed using a methacrylic resin, and a heating temperature for joining said passage members is set at 110 to 130° C.

6. A manufacturing method for a fluid passage forming member made of a synthetic resin according to claim 5, wherein a cast material is used as the methacrylic resin for forming the passage members.

7. A manufacturing method for a fluid passage forming member made of a synthetic resin according to claim 1, wherein a single or a plurality of auxiliary passages (25) for opening holes (23) or grooves (24) into the forming mold are formed in the passage members (21a through 21c).

8. A manufacturing method for manufacturing a fluid passage forming member (1, 21) made of a synthetic resin by joining at least two passage members (1a through 1c, 21a through 21c) that are formed of a thermoplastic synthetic resin and have junction surfaces (2, 2) to be joined with each other, said method comprising the steps of:
    forming fluid passages composed of apertures (3, 23) or grooves (4, 24) in communication with each other between a pair of passage members in the junction surfaces (2, 2) between said passage members, allowing for shrinkage of the passages in advance so that fluid passages having predetermined design sections may be formed by shrinkage of said fluid passages during a heating and joining process of the pair of passage members; and closely fitting said passage members in a forming mold (10) with the passage members joined with each other at junction surfaces, sealing the mold while pressing the junction surfaces to be joined to each other into contact, and heating and softening them to join them by melting at said junction surfaces thereby effecting connection at the junction surfaces of said passage members, wherein, in joining said passage members, deformation of the passage members in a direction orthogonal to said junction surfaces is restrained by an inner surface of the sealed forming mold, and a flow component of a material produced due to expansion of the passage members caused by heating of the passage members and contact pressing of said junction surfaces is moved along a surface parallel to the junction surfaces thereby to absorb it mainly by shrinkage of said fluid passages, and wherein the passage members are formed using a methacrylic resin, and a heating temperature for joining said passage members is set at 110 to 130° C.

9. A manufacturing method for a fluid passage forming member made of a synthetic resin according to claim 8, wherein a cast material is used as the methacrylic resin for forming the passage members.

10. A manufacturing method for a fluid passage forming member made of a synthetic resin according to claim 8, wherein the thermoplastic synthetic resin constituting the passage members is provided with a light transmitting property.

11. A manufacturing method for a fluid passage forming member made of a synthetic resin according to claim 8, wherein close fitting of the passage members into the forming mold is effected by pressing a mold piece (11*b*, 15*a*) into contact with the passage members in the forming mold at least in one direction among a plurality of directions including a direction in which the passage members joined with each other at the junction surfaces are deposited and a direction parallel to said junction surfaces thereby to fix them.

12. A manufacturing method for a fluid passage forming member made of a synthetic resin according to claim 8, wherein a contact pressing force between the junction surfaces of the passage members at the time of sealing the forming mold is set by a tightening torque of a bolt for fixing an upper mold piece of the forming mold.

13. A manufacturing method for a fluid passage forming member made of a synthetic resin according to claim 8, wherein a single or a plurality of auxiliary passages (25) for opening holes (23) or grooves (24) into the forming mold are formed in the passage members (21*a* through 21*c*).

* * * * *